Oct. 13, 1936. Z. OSHIRO 2,057,537
FLOWER HOLDER
Filed Jan. 2, 1936  2 Sheets-Sheet 1

INVENTOR:
ZENTEI OSHIRO.
BY ATTY: Edward M. Kojima

Oct. 13, 1936.  Z. OSHIRO  2,057,537
FLOWER HOLDER
Filed Jan. 2, 1936  2 Sheets-Sheet 2

INVENTOR:
ZENTEI OSHIRO.
BY ATTY: Edward M. Kojima

Patented Oct. 13, 1936

2,057,537

UNITED STATES PATENT OFFICE 2,057,537

FLOWER HOLDER

Zentei Oshiro, Pasadena, Calif.

Application January 2, 1936, Serial No. 57,171

9 Claims. (Cl. 47—41)

This invention relates to an improved flower holder, and has for its objects to provide a holder which can be used to stick on any cut flowers, to hold the stems thereof by a frame, and to provide a holder that may be set in a dish or pan of water and maintain the flowers in the desired position.

Another object is to hold the stems of cut flowers in so tight, and to maintain them in position on sharp points in the base of the holder whereby to allow of absorption of water to keep the flowers in condition for a long period of time.

Another object is to provide a holder having a frame that will give the flowers three points of support, to provide a holder allowing the flowers to take up water easily, to provide a holder that is less liable to rust and corrosion, and to make a flower holder that is cheap for the purpose intended.

Figure 1:
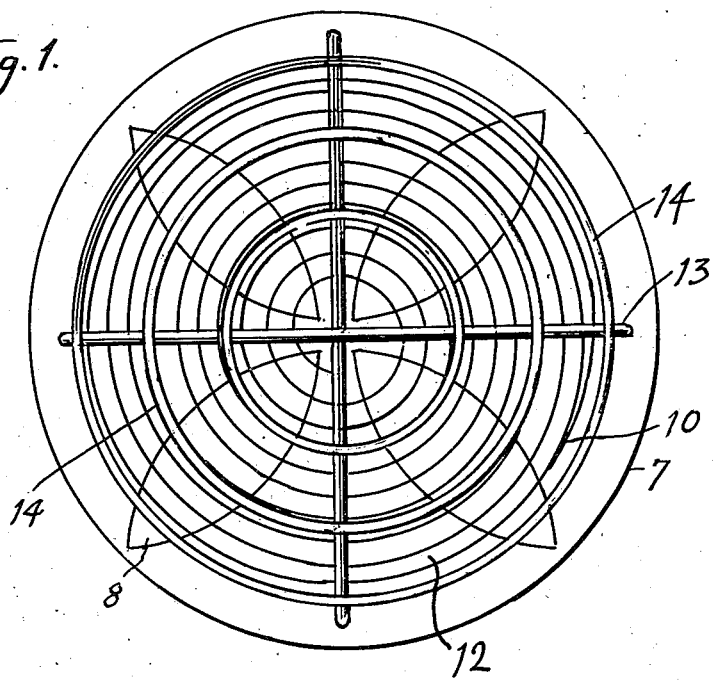
Figure 2:
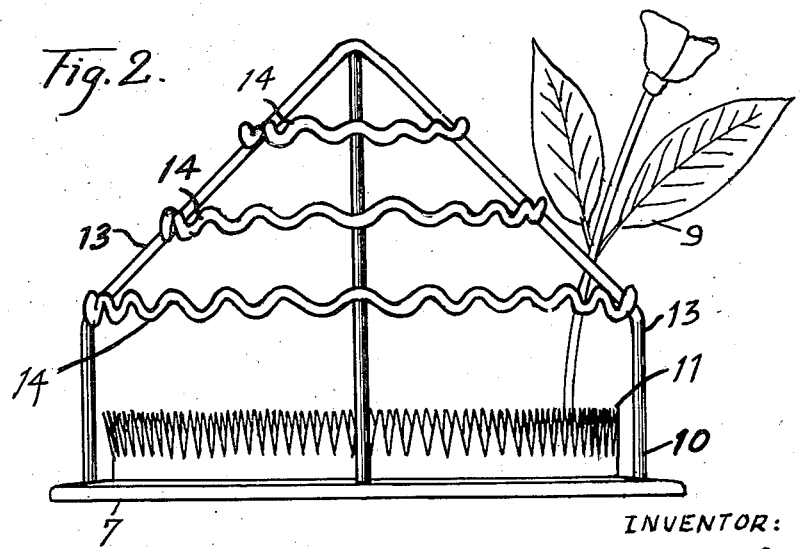
Figure 3:
Figure 4:
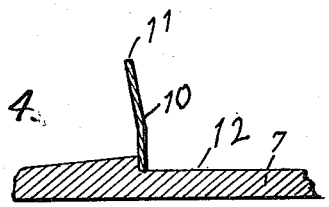
Figure 5:
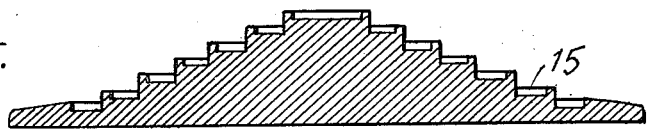
Figure 6:
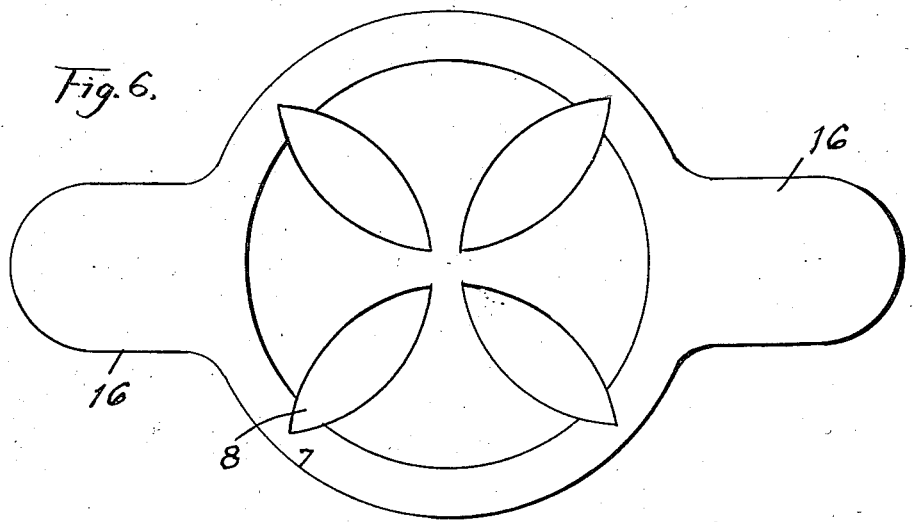

In the drawings, Figure 1 is a top plan view of my improved flower holder. Fig. 2 is a side elevation of the flower holder showing a flower mounted therein. Fig. 3 is a sectional view of the base. Fig. 4 is a fragmentary view showing the base in section, and a part of the pointed rack mounted thereon. Fig. 5 is a sectional view of a modified form of base. Fig. 6 is a plan view of a modified form of base adapted to support very tall cut flowers and to keep them from overturning.

Referring in detail to the drawings, the base 7 is provided with apertures 8 which allow water to reach quickly and easily the stems of the cut flowers 9. A serrated rack 10, having a plurality of sharp points 11, is mounted on the base, which has a depressed top 12 adapted to receive rack 10. The radial frame members 13 project upwardly from the base, and have secured thereto the annular frame members 14, which are corrugated and decrease in diameter as they approach the apex of the radial frame, to hold the flowers more securely in the desired position. The rack 10 is spirally mounted on base top 12, and is secured at its outer end. In the modified form of base shown in Fig. 5 a spiral groove 15 is provided in which to mount the rack, and the base is made in a cone shape. The rack 10 may be made in one piece or may consist of a plurality of pieces.

In the modified form shown in Fig. 6, base 7 is provided with radial lugs 16, extending outwardly to form a more substantial support for extra long or heavy cut flowers.

With the foregoing and other objects in view the invention resides in the combination and arrangement of parts as herein described, it being understood that minor changes may be made that fall within the scope of the appended claims.

I claim:

1. A flower holder, comprising a base, a frame extending upwardly from the base, annular corrugated rings carried by the frame, and a serrated rack member mounted on the base.

2. A flower holder, comprising a base, a frame extending upwardly from the base, annular corrugated round frame members fixed to the upwardly extending frame and spaced apart from one another, and a serrated rack member mounted on the base and extending within the limits of the frame.

3. A flower holder, comprising a base having a top depression, a frame extending upwardly from the base, annular corrugated rings carried by the frame, and a serrated rack member mounted on the depressed top portion of the base.

4. A flower holder, comprising a base, a frame extending upwardly from the base, and a serrated rack member mounted on the base, and having outwardly flaring prongs.

5. A flower holder, comprising a base having a plurality of apertures therein, a frame extending upwardly from the base, and a serrated rack member mounted on the base and extending over said apertures, and spaced from the bottom of the base.

6. A flower holder, comprising a base having a plurality of apertures therein, a frame extending upwardly from the base, and a serrated rack member mounted on the base and extending over said apertures, and said apertures extending beyond the outer limits of said rack member.

7. A flower holder, comprising a base having a plurality of apertures therein, a frame extending upwardly from the base, and a spiral and serrated rack member mounted on the base.

8. A flower holder, comprising a base, a wire frame extending upwardly from the base, and a spiral and serrated rack member mounted on the base, and extending within the limits of the frame.

9. A flower holder, comprising a base, a wire frame extending upwardly from the base, and extending to an apex at the top, annular corrugated rings carried by the frame and decreasing in diameter as they approach the apex of the frame, and a serrated rack member mounted on the base.

ZENTEI OSHIRO.